L. J. KOZUB.
BEARING.
APPLICATION FILED MAR. 2, 1911.
1,156,695.
Patented Oct. 12, 1915.
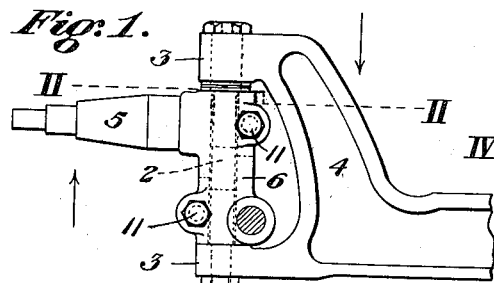
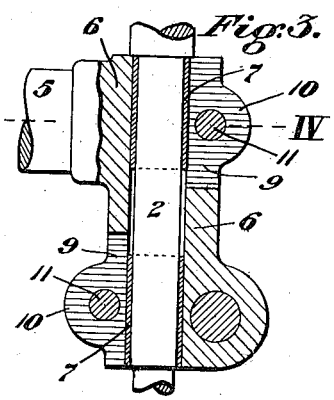
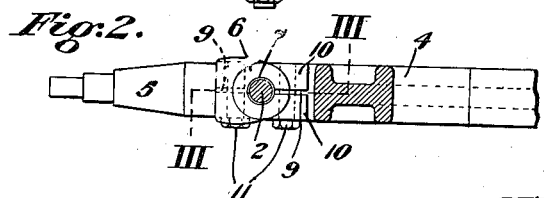
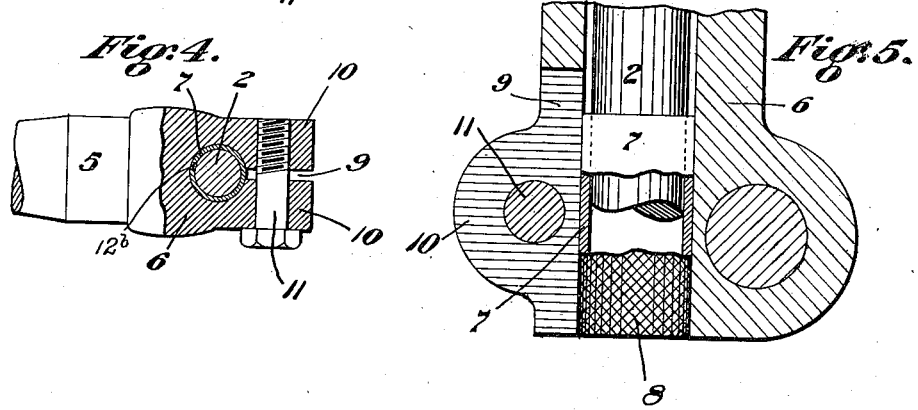
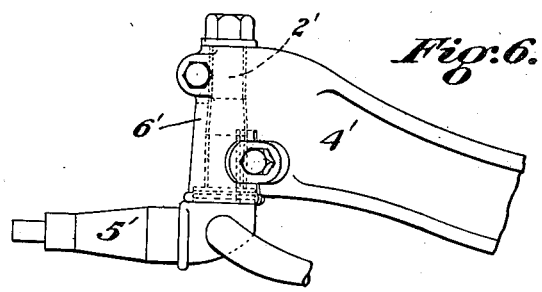
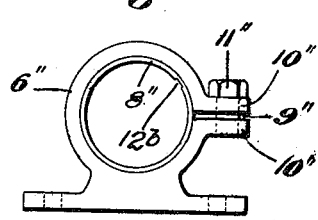
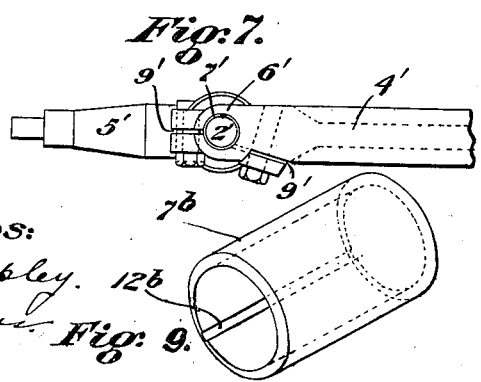
Witnesses:
Chas. S. Lepley.
Henry Benn
Inventor:
Louis J. Kozub
by C. M. Clarke
his attorney

UNITED STATES PATENT OFFICE.

LOUIS J. KOZUB, OF PITTSBURGH, PENNSYLVANIA.

BEARING.

1,156,695.  Specification of Letters Patent.  Patented Oct. 12, 1915.

Application filed March 2, 1911. Serial No. 611,868.

*To all whom it may concern:*

Be it known that I, LOUIS J. KOZUB, a citizen of the United States, residing at Pittsburgh, in the county of Allegheny and State of Pennsylvania, have invented certain new and useful Improvements in Bearings, of which the following is a specification.

My invention consists of an improvement in bearings for spindles, shafts, etc., and relates particularly to the use of one or more thin integral continuously annular bushings mounted within an outer adjustable housing and adapted to embrace and provide a bearing for an inclosed spindle or shaft.

The object in view is to provide a bearing in which the surface of the bearing metal around the spindle or shaft shall be continuous without any break or interruption for its entire circumference, symmetry of bearing and equal wear. The bushing, being made of a comparatively thin gage, is adapted to be shrunk inwardly by the embracing housing to take up wear and prevent lost motion, so as to insure a good serviceable bearing at all times.

The invention is illustrated in some of its applications in the accompanying drawings, in which:

Figure 1 shows the use of the device as applied to the front axle bearing of an automobile, in elevation. Fig. 2 is a plan view of the swivel axle bearing, the supporting spindle being in section on the line II. II. of Fig. 1. Fig. 3 is a vertical sectional view on the line III. III. of Fig. 2. Fig. 4 is a horizontal sectional view on the line IV. IV. of Fig. 3. Fig. 5 is a detail sectional view partly broken away, of the lower portion of the spindle bearing, and illustrating one manner of fixedly holding the bushing within the bearing. Fig. 6 is a view similar to Fig. 1 showing a modified construction. Fig. 7 is a plan view of Fig. 6. Fig. 8 is a view in elevation, of an ordinary shaft bearing constructed in accordance with my invention. Fig. 9 is a perspective detail view of a modified form of the bushing.

In the drawings, 2 is a spindle mounted by its ends in the terminals 3, 3, of a suitable bracket 4, as the front axle member of an automobile. The spindle 2 is preferably fixedly secured to prevent rotation within its supporting bearings, by terminal nuts as shown, or otherwise and, in the construction shown in Fig. 1, is subject to the thrust of the load of the vehicle supported upon the wheel which is mounted upon the axle 5. Said axle extends laterally from the embracing bearing 6, and is made integral therewith or secured therein by any suitable means.

Bearing 6 is provided with a longitudinally cylindrical cavity for insertion of the bushing or bushings 7 of continuous annular form. Said bushings are inserted within the cylindrical opening so as to provide a tight binding fit, for which purpose the interior of the cylindrical space may be knurled or treated in any other similar manner as indicated at 8, to form a tight intimate contact or driving fit with the exterior of the bushing 7.

The bearing 6 is slotted through one or both sides as indicated at 9, the sides at such parts being provided with lugs or ears 10, to adjust the bearing around the bushing.

As stated, the bushing may be continuous from one end to the other, or in the form of a plurality of sections as shown in the automobile axle construction, providing the bearings at the points of greatest thrust. The slotting of the bearing at opposite sides as shown, in conformity with the strain, indicated by the arrows, provides a solid backing confronting the greatest pressure at diagonal points of the bearing and it will be understood that the utilization of the invention in any construction is within the discretion of the designer.

By dividing the bearing in the manner shown and providing it with tightening bolts 11, the wear upon the interior of the bushing may be compensated for by shrinking the entire annular bushing inwardly by adjustment of the divided halves of the surrounding bearing. This operation is entirely practicable, as has been shown in practice, and with careful adjustment and a properly made surrounding bearing, the inward compression of the bushing to adjust it to the diameter of the spindle is easily and accurately accomplished.

In the construction shown in Fig. 6, the general arrangement of the parts is substantially the same as above described, except that the bracket 4' itself terminates in the bearing 6' having the dividing slots 9', bolts 11' and the inserted bushings 7'. The spindle 2' extends upwardly through the cylindrical cavity and in engagement with the bushings, being preferably of a reduced diameter at its upper end and having the projecting axle 5' at its lower portion.

In Fig. 8, the bushing 8'' is shown mounted within a one-piece bearing 6'' having a dividing slot 9'' at one side with ears or lugs 10'' and a holding bolt or bolts 11''. The bearing 6'' is provided with flanges as shown, or is constructed in any other suitable manner for attachment to a supporting base.

In Fig. 9 the bushing 7$^b$ is shown as eccentric, for adjustment of the spindle or shaft of any gear mechanism, as a worm. The bushing in such or other desired form may be provided with a longitudinal groove 12$^b$ on its interior surface part way through the metal, which is thereby maintained continuously integral annularly. The advantage of such construction is that, if it is desired to employ heavier or thicker bushings having great resistance to compression, the weakening slots will admit of the annular shrinkage of the bushing, while the maintenance of the annular exterior continuity will always insure an outward binding pressure against the embracing housing. This feature is important and valuable in preventing turning of the bushing and in insuring a constant tight bearing between the bushing and housing.

The advantages of the invention will be readily appreciated by all those familiar with the usual troublesome causes of lost motion, the necessity of re-bushing or re-lining, all of which are avoided by the use of my invention. Its application is in no way limited to any specific structure and its simplicity, cheapness and the serviceability and ease of manipulation render it available to a large class of users.

Having described my invention, what I claim is:—

1. In combination, a continuous integral annular bushing having a cylindrical unbroken wall and of uniform gage, and a spindle bearing comprising a housing embracing the bushing and adapted to be adjusted to compress the same to compensate for wear thereof.

2. In combination, a continuous integral annular bushing having a cylindrical unbroken wall and of uniform gage, a housing having a cylindrical cavity and a slotted division at one side, and means for adjusting the sides of said division toward each other to compress the bushing to compensate for wear thereof.

3. In combination, a continuous integral annular bushing having an interior weakening groove extending from end to end and partially through the wall of the bushing and substantially parallel to the axis thereof, the remainder of the surface of the bushing containing the groove being smooth and unbroken, a housing having a cylindrical cavity and a slotted division at one side, and means for adjusting the sides of said division toward each other to compress the bushing to compensate for wear thereof.

4. The combination with a housing having a cylindrical cavity and means for adjustment of the housing, of a continuous integral annular bushing of uniformly thin metal with an unbroken wall, said bushing being capable of adjustment by compression within the housing to compensate for wear of the bushing.

In testimony whereof I hereunto affix my signature in the presence of two witnesses

LOUIS J. KOZUB.

Witnesses:
C. M. CLARKE,
CHAS. S. LEPLEY.